United States Patent Office 3,473,040
Patented Oct. 14, 1969

3,473,040
MULTI-PURPOSE POWER SUPPLY APPARATUS FOR PROVIDING ALTERNATING OR DIRECT CURRENT
Adolphe Cominassi, Fontoy, and Etienne Danko, Bionville-sur-Nied, France, assignors to Mobelec Societe Anonyme Holding, Luxembourg-Ville, Luxembourg, a corporation of Luxembourg
Filed Feb. 21, 1967, Ser. No. 617,660
Claims priority, application Luxembourg, Sept. 14, 1966, 51,968
Int. Cl. H02j 1/00, 3/00
U.S. Cl. 307—11     3 Claims

ABSTRACT OF THE DISCLOSURE

An apparatus for transforming, inverting and/or converting electric current employing a transformer having a plurality of primary and secondary windings, an adjustable rectifier circuit and a power oscillator circuit. Switches permit connecting of the rectifier and/or oscillator circuits to selected secondary windings of the transformer. With power provided from an alternating current source, the apparatus may function as an autotransformer, set-up or step-down isolation transformer and/or controlled rectifier. With power provided from a direct current source, the apparatus may function as a static inverter and/or a static converter for A.C. to D.C. conversion.

BACKGROUND OF THE INVENTION

Field of the invention

This invention relates to electric power supplies. More particularly, this invention is directed to a transformer and converter unit and, more specifically, to apparatus forming a supply of alternating current as well as direct current at different voltages.

Description of the prior art

It often happens in manufacturing or repair-shops that various working operations have to be carried out separately or simultaneously with electrical instruments or machines which require currents of different nature and voltage. Now, more often than not, one has at one's disposal only either the mains A.C. voltages of the 110, 220 or 380 volts or D.C. voltages from batteries or accumulators of 6 or 12 volts.

In the prior art, transformers are known which, starting from A.C. input voltage, produce a number of A.C. output voltages of different values. Current rectifier circuits using rectifiers of the thyristor type which convert an A.C. input voltage into a D.C. output voltage and provide an adjustable supply of direct current are also known. Static inverters using transistors which become in turn conductive, and which connect alternately a supply of direct current to opposite halves of a primary winding of a transformer having a center tap to generate an alternating current, are equally known.

All these apparatus, although individually showing certain advantages are, however, very limited as to their field of application.

Although it becomes more and more necessary to have together in one apparatus all the advantages of the various circuits which have been described above, and a real need for such an apparatus has been existing for a long time, such a combination has not yet been achieved.

SUMMARY OF THE INVENTION

The object of this invention is to produce an electrical apparatus for transforming and converting current which is simple, robust and economical in its design and construction, and which unites in a compact and high output unit the advantages of the apparatuses already described.

The apparatus according to the invention comprises, in particular, a current rectifying circuit and a D.C. inverter circuit, both of which preferably include controlled semiconductor elements, the two circuits being associated with a single transformer having a plurality of windings in such a manner as to produce a source supplying separately or simultaneously a number of alternating and/or direct currents at various voltages.

According to one embodiment of the invention, a transformer with saturable core having a primary winding with a plurality of intermediate taps and a secondary having a number of separate windings is used. Switches enable the connection of either a rectifier circuit or an inverter circuit to the windings of the secondary of the transformer. Thus, the system can either work as rectifier of an A.C. into a D.C. current, or as converter of a D.C. into an A.C. current, or by putting off-circuit the inverter circuit, as simple insulating transformer, safety transformer or autotransformer.

The rectifier circuit preferably comprises a bridge circuit having two arms of semiconductor diodes and two arms including each a controlled semiconductor device of the same type, such as a thyristor. Control windings, being part of the secondary of the transformer are connected to the control electrodes of the thyristors, thus performing the control of alternative conduction of these devices.

According to one feature of the present invention, the balancing of the rectifier bridge is made by means of the control circuits of the two thyristors. Indeed, each one of the control circuits of the thyristors includes a voltage divider circuit each having an adjustable resistance and a potentiometer. The adjustable resistance of the divider circuits allow the individual adjustment of the ignition points of the two thyristors of the bridge, whilst the potentiometers, the cursors of which have a common control, allow the common displacement of the ignition point along the A.C. voltage curve.

The inverter circuit comprises an oscillating circuit having two pairs of power transistors of the same type connected in order to give an inverter circuit of the "push-pull" mode. The transistors of each pair are connected in parallel to increase the output power of the inverter. The balancing of the various transistors is made with adjustable resistances in the control circuits thereof. The output voltage can be taken from one of the primary or secondary windings of the transformer. The control windings of the oscillating circuit are part of the secondary of the transformer and are connected to the control electrodes of the transistors to apply signals performing the alternative conduction of the transistor pairs.

According to another feature of the invention, the D.C. input voltage is applied to the inverter circuit by a group of diodes connected in such a way that passage of an electric current can only take place in the direction of conduction of the transistors. An accidental change of the polarity of the input voltage can thus not damage the inverter elements. Similarly, a capacitor is connected in the control circuit of the inverter so that an overload or a short circuit in the load circuit causes at once a cut-off of the inverter. Thus the invention allows the reduction of transient voltages and to protect the transistors and other semi-conductor devices of the apparatus from high reverse currents.

BRIEF DESCRIPTION OF THE DRAWINGS

The invention may be better understood and its numerous advantages will become apparent to those skilled in the art by reference to the accompanying drawings wherein like reference numerals refer to like elements in the various figures and in which.

DESCRIPTION OF THE PREFERRED EMBODIMENT

Figure 1:
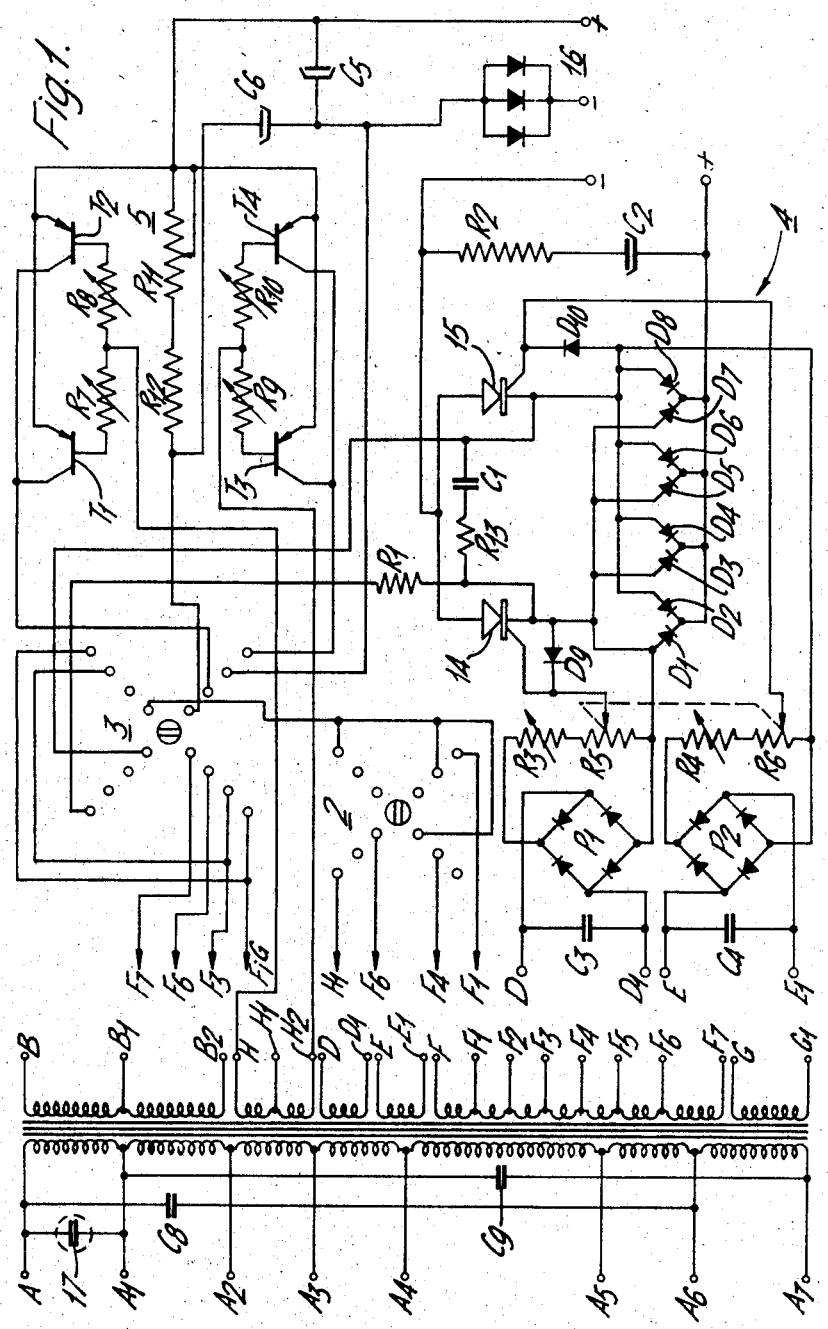
FIGURE 1 is a schematic circuit diagram of a transformer and converter unit in accordance with the invention.

The transformer and converter unit, as it is shown in FIGURE 1, comprises four essential parts and includes, in particular, a transformer 1, two switches 2 and 3, a rectifier circuit 4 and a D.C. inverter circuit having a power oscillator 5.

Figure 2:
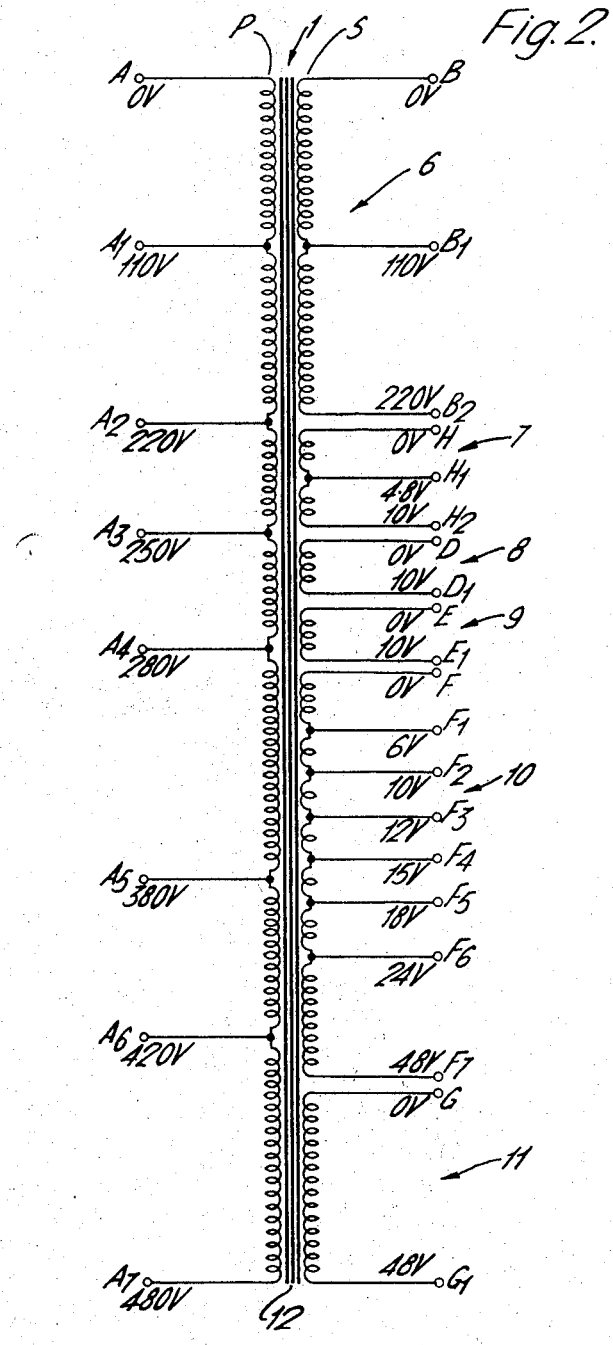
FIGURE 2 shows the different windings of the transformer of the apparatus according to FIGURE 1.

As is shown in FIGURE 2, the transformer 1 comprises a primary winding P subdivided into a number of parts and having the taps A, $A_1$, $A_2$, $A_3$, $A_4$, $A_5$, $A_6$ and $A_7$ which correspond to voltages of 0, 110, 220, 250, 280, 380, 420 and 480 volts. The secondary S of the transformer 1 has several separate windings of which the first winding 6 includes the taps B, $B_1$ and $B_2$ corresponding to voltages of 0, 110 and 220 volts. A second winding 7 of the secondary S has the taps H, $H_1$ and $H_2$ corresponding to voltages of 0, 4, 8 and 10 volts. Two identical windings 8 and 9 of the secondary S have the taps D, $D_1$ respectively E, $E_1$ corresponding to voltages of 0 and 10 volts. A winding 10 of the secondary S of the transformer 1 is subdivided in a number of parts having the taps F, $F_1$, $F_2$, $F_3$, $F_4$, $F_5$ and $F_6$ corresponding to voltages of 0, 6, 10, 12, 15, 18, 24 and 48 volts. The secondary S of the transformer 1 finally includes a winding 11 having output terminals G and $G_1$ corresponding to voltages of 0 and 48 volts.

The core of the transformer 1, which is preferably made of a sheet metal for high-grade transformer having practically no remanence, is shown by reference numeral 12. The insulation of the various windings of the transformer 1 is made in such a manner that a temperature rise above 150° C. presents no danger to the transformer. By selecting the appropriate materials and by a very accurate winding, an efficiency of 86% to 88% can thus be obtained.

In FIGURE 1, the switch 2 is a rotary multipolar switch with four directions for three different circuits, whilst switch 3, which is also of the rotary type permits the simultaneous switching in four directions of four different circuits.

Figure 3:
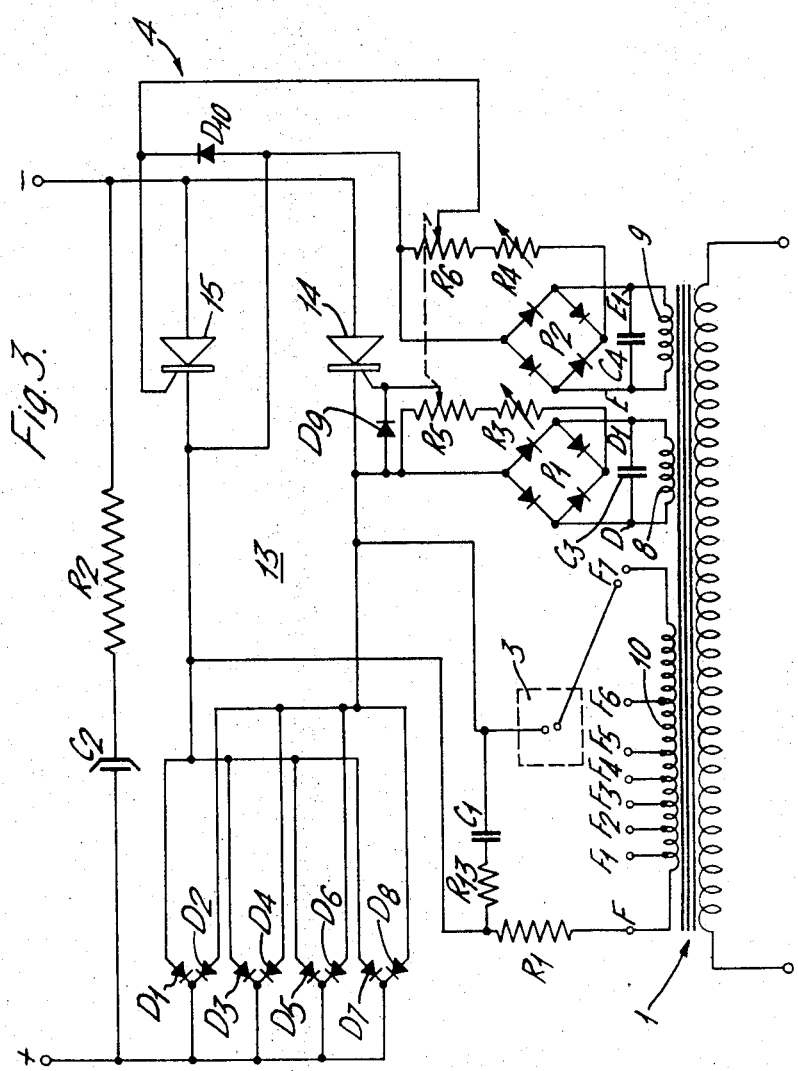
FIGURE 3 illustrates the rectifier circuit of the apparatus according to FIGURE 1.

The current-rectifying circuit 4 of the transformer and converter unit according to FIGURE 1 is shown in FIGURE 3, which gives the circuit diagram thereof. This circuit comprises a full wave rectifier bridge 13 of which two branches are each consisting of four diodes connected in parallel $D_1$, $D_3$, $D_5$ and $D_7$ respectively $D_2$, $D_4$, $D_6$ and $D_8$. The other two branches of the bridge 13 consist each of a controlled semi-conductor element, such as the thyristors 14 and 15. The supply voltage is applied to the rectifier bridge 13 by a RC element consisting of a resistance $R_1$ connected in series, and a resistance $R_{13}$ and a capacitor $C_1$ connected in parallel to the input terminals of the bridge. The supply voltage is supplied by the winding 10 of the secondary S of the transformer 1. This voltage is applied via the switch 3 which enables the application of different voltages supplied by the intermediate taps $F_1$, $F_2$ . . . $F_7$ of the secondary winding 10. The winding 11 of the secondary S of the transformer 1 can also supply the input voltage to the rectifier bridge 13.

A capacitor $C_2$ and a resistance $R_2$ are connected in parallel to the output terminals of the rectifier bridge 13 which enable the attenuation of the reverse voltage to the diodes of the rectifier bridge 13. On the other hand, this RC element maintains the rectified output peak voltage of the bridge 13 and thus facilitates the striking of the arc between the welding electrodes, in the case the apparatus is used as a source of current for a welding apparatus.

The control circuits of the two thyristors 14 and 15 are fed by the secondary windings 8 and 9 of the transformer 1. The output voltages of the two secondary windings 8 respectively 9 are applied to two diode bridges $P_1$ respectively $P_2$. A capacitor $C_3$ is connected in parallel between the taps D, $D_1$ to the secondary winding 8, and a capacitor $C_4$ is connected in parallel between the taps E, $E_1$ to the secondary winding 9. These capacitors $C_3$ and $C_4$ are used to attenuate the reverse currents of the diode bridges $P_1$ respectively $P_2$. The D.C. voltages at the output terminals of the diode bridges $P_1$ respectively $P_2$ are applied to voltage dividing circuits, including an adjustable resistance $R_3$ and a potentiometer $R_5$ respectively an adjustable resistance $R_4$ and a potentiometer $R_6$. The cursor of the potentiometer $R_5$ is connected to the control electrode of the thyristor 14 and the cursor of the potentiometer $R_6$ is connected to the control electrode of the thyristor 15. By the displacement of the cursors of the potentiometers $R_5$ and $R_6$ the currents of the control circuits can be varied and thus the ignition point of the thyristors.

It is well known in the art of the semi-conductors, that for semi-conductor elements of the same type and of the same manufacture, the variations of their characteristics, which cannot be eliminated totally by their method of manufacture, have a great influence on their behavior in closed circuits. Thus the ignition characteristics generally vary to a certain extent from one thyristor to another of the same type. For good operation of the rectifier bridge 13, it is therefore absolutely necessary that the currents of the control circuits are identically proportional in relation to the characteristics of ignition of the two thyristors 14 and 15.

In accordance with one feature of the invention the resistances $R_3$ and $R_4$ of the two control circuits are made adjustable in order to be able to adjust independently the ignition currents in these two circuits and to thus adjust the initial ignition point of the two thyristors at exactly the same point of the voltage curve, independently of their characteristics. Once the initial ignition points are adjusted for the two thyristors, they can be displaced in varying the currents of the control circuits by means of potentiometers $R_5$ and $R_6$ of same magnitude and whose cursors are operated by the same control. In this way, the ignition points of the two thyristors 14 and 15 are always located at exactly the same place of the A.C. voltage curve to be rectified, so that the rectifier bridge 13 is perfectly balanced.

A diode $D_9$ and a diode $D_{10}$ are connected between the control electrode and the cathode of the thyristors 14 and 15 in order to limit the reverse voltages.

Figure 4:
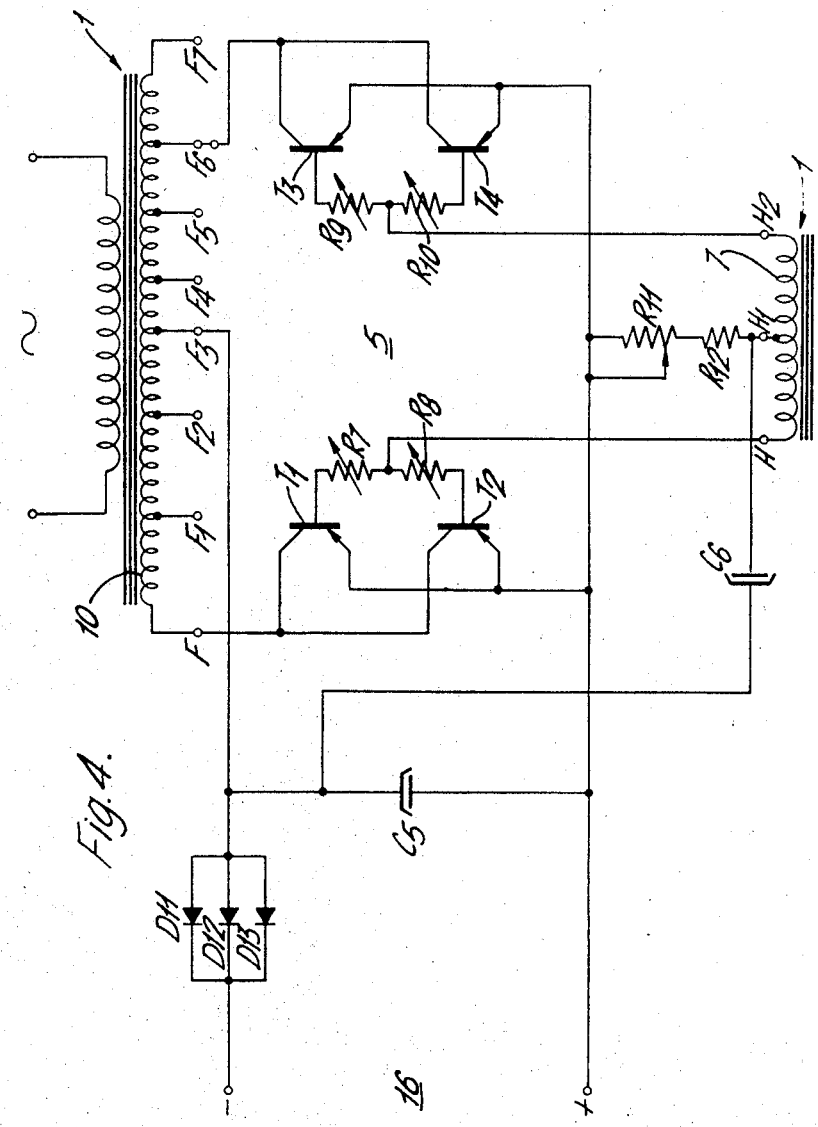
FIGURE 4 illustrates the power oscillator of the apparatus according to FIGURE 1.

FIGURE 4 shows a D.C. inverter circuit comprising a transistor power oscillator 5 which enables converting direct current into alternating current. As a supply of direct current a simple car battery can, for instance, be used. In FIGURE 4, $T_1$ and $T_2$ represent two transistors, of which the power circuits, emitter-collector, are connected in parallel, and $T_3$ and $T_4$ also represent two transistors which have their emitter-collector circuits also connected in parallel. The emitters of the two pairs of transistors $T_1$, $T_2$ and $T_3$, $T_4$ are connected to each other and to the positive terminal of the power supply 16. The collectors of the transistors $T_1$, $T_2$ are connected by means of the multipolar switch 3 (FIGURE 1) to the terminal F of the secondary winding 10 of the transformer 1. The collectors of the pair of transistors $T_3$, $T_4$ are connected by means of switch 3 (FIGURE 1) to the tap $F_6$ of the secondary winding 10 of the transformer 1.

Instead of using two pairs of transistors connected in parallel, one can of course, use only two transistors or a larger number of transistors, depending on the power required at the output terminals of the inverter.

The negative terminal of the D.C. supply is connected the power oscillator 5 via the secondary winding 10, the center tap $F_3$ being connected via switch 3 to the negative terminal of the D.C. supply source 16.

The inverter which has been described is thus of the type using transistors which become in turn conductive and which alternatively connect a D.C. supply source to one and the other half of a transformer winding having a center tap, which causes a current to alternately flow in the halves of the winding in opposite directions.

Between the negative terminal of the supply source 16 and the center tap $F_3$ of the secondary winding 10, a group of diodes comprising diodes $D_{11}$, $D_{12}$ and $D_{13}$ connected in parallel, is inserted, so as to limit the reverse current, in the event of an accidental inversion of the polarity of the supply current. Between the common point of the anodes of the diodes $D_{11}$, $D_{12}$ and $D_{13}$ and the positive terminal of the supply source 16, a capacitor $C_5$ has been connected in order to attenuate the inductive currents of the oscillating circuit. The A.C. output voltage for the load circuit can be taken, either at the taps of the primary P of the transformer 1, or at the taps of the windings 6, 8, 9 or 11 of the secondary S of the transformer 1, depending on the voltage required.

The self-excitation of the power oscillator 5 is made by winding 7 of the secondary S of the transformer 1, of which the tap H is connected to the common point of two adjustable resistances $R_7$ and $R_8$. The free ends of these resistances $R_7$ and $R_8$ are connected to the base of transistor $T_1$ respectively to the base of transistor $T_2$. Similarly, the tap $H_2$ of the secondary winding 7 is connected to the common point of the two adjustable resistances $R_9$ and $R_{10}$, of which the free terminals are connected to the base of the transistor $T_3$ respectively to the base of transistor $T_4$. The polarizing currents of the bases of the different transistors $T_1$, $T_2$, $T_3$ and $T_4$ can in this way be individually adjusted. The polarization voltage of the bases is applied via a voltage divider circuit, comprising a potentiometer $R_{11}$ and a resistance $R_{12}$, connected between the positive terminal of the supply source 16 and the center tap $H_1$ of the control winding 7 of the secondary S of the transformer 1. A capacitor $C_6$ is connected between the center tap $H_1$ of the control winding 7 and the center tap $F_3$ of the output winding 10 of the secondary S of the transformer 1. The control voltages induced in the parts H, $H_1$, and $H_1$, $H_2$ of the control winding 7, which depend on the current flow in the output winding 10, perform the alternate conduction of the transistors $T_1$, $T_2$ respectively $T_3$, $T_4$. The transistors operate as switches, being either completely conductive or nonconductive. The adjustment of the output power can be made by means of the potentiometer $R_{11}$.

The capacitor $C_6$ has the double task to help on one hand, by the charge which it accumulates, maintaining the oscillations, and on the other hand, blocking the oscillator in the case of an overload or a short-circuit in the load circuit. As soon as the overload is compensated or as soon as the short-circuit is interrupted, the charge accumulated by the capacitor $C_6$ effects the automatic starting of the oscillator.

Referring now to FIGURE 1, which illustrates the entire circuit diagram of an apparatus for transforming and converting electric current according to the invention, a capacitor $C_8$ is connected between the tap A (0 volt) and the intermediary tap $A_6$ (420 volts) of the primary winding P of the transformer 1. Similarly, a capacitor $C_9$ is connected between the terminals A and $A_7$ of the primary winding P of the transformer 1. These capacitors $C_8$ and $C_9$ have the functions of anti-parasite circuit of the apparatus and of balancing circuit of the primary P of the transformer 1.

An indicator lamp 17 is connected between the input terminals A and $A_1$ of the transformer 1.

As shown in FIGURE 1, in a first mode of operation, depending on the position of switches 2 and 3, the apparatus can work as autotransformer of 110 to 220, 250, 280, 380, 420 and 480 volts respectively or inversely. Similarly, in this way of operation, the apparatus can work either as insulating transformer 110, 220 volts (secondary winding 6) or as safety transformer, for instance of 6, 12, 24 and 48 volts (secondary windings 10 and 11).

In a second mode of operation, depending on the position of the switches 2 and 3, the apparatus operates as rectifier, supplying full wave rectified current. The output voltages can be varied, for instance, from 6, 12, 24 to 48 volts by means of switch 2 which applies to the rectifier bridge 4 the output terminals F, $F_1$ ... to $F_7$ of the winding 10 of the secondary S of winding 10 of the secondary S of the transformer 1 a voltage increase of 100% can be obtained. Similarly, by a parallel connection of the two secondary windings 10 and 11 an increase of 100% of current intensity is obtained. The rectified output current can be varied in a continuous manner in its intensity by the thyristors 14 and 15 of the rectifier bridge 13.

In this mode of operation the apparatus supplies a direct current at varying voltages and intensities and it can be used, for instance, as a supply source for an arc welding machine using welding electrides having a thickness of 1.2 to 5 mm. It can also be used as supply source for galvano-plastic and electrolytic operations, as battery charger or as starter for internal-combustion engines etc., to quote only a few applications.

As can be seen from FIGURE 1, the apparatus according to the invention can operate simultaneously in these two methods of operation, so that it forms at the same time a supply source for alternating and direct currents at various voltages.

In a third mode of operation of the apparatus, depending on the positions of the switches 2 and 3, it operates as a static inverter to change direct current into alternating current at various voltages. The output voltages can be taken either at the primary winding, or at the secondary windings 6, 8, 9 or 11 of the transformer 1. The load can be resistive, inductive and/or capacitive. The variation of the power delivered is made by means of the potentiometer 11 of the control circuit of the oscillator 5. In this mode of operation the apparatus can be used as a supply source of alternating current for all static machines or electric power engines.

The apparatus can finally operate at the same time as D.C. inverter and A.C. rectifier, so that starting from a given D.C. voltage one can obtain a D.C. voltage of a different value. In this case, it is necessary to modify the embodiment of the invention shown in FIGURES 1 to 4 in providing for supplementary connection and switching possibilities.

An essential advantage of the apparatus according to the invention resides in its vast field of application. Indeed by an optimum use of the windings of a transformer associated to a coverter and rectifier circuit, an apparatus for transforming and converting current has been designed, which is characterized by its high efficiency, its simplicity, its robustness and its compactness. The apparatus in accordance with the invention, not depending largely on the power supply which one has at one's disposal, can be used everywhere where a transformation or conversion of current is necessary for the satisfactory working of an electrical machine. Thus, it can be used as current supply source for an electric arc welding machine, supply source for galvanoplastic and electrolytic operations as multiple-voltage transformer, as charger or rapid charger for batteries, starter for cars etc. It can also be used in navigation and aviation.

Another essential advantage of the apparatus in accordance with the invention resides in the possibility which it gives to its user, to furnish at the same time A.C. and D.C. voltages.

Another advantage of the apparatus in accordance with the invention resides in that it is not affected by overloads and short-circuits in the load circuit or by an accidental inversion of the polarity of the supply source of the D.C. inverter circuit.

Accordingly, it may be seen that the present invention has been described by way of illustration and not limitation.

What is claimed is:

1. Apparatus for transforming and converting electric current comprising:
 a transformer having a primary winding and a plurality of secondary windings, at least a pair of said secondary windings having center taps;
 rectifier means for converting alternating current to direct current, said rectifier means including:
  a bridge circuit, at least two legs of said bridge circuit including controlled rectifier devices,
  means for generating direct current control voltages for said controlled rectifier devices, said control voltage generating means being connectable to respective secondary windings of said transformer, and
  voltage divider means connected across each of said control voltage generating means, said voltage divider means each including a potentiometer and variable resistance in series, the cursors on said potentiometers being connected to the control electrodes of associated controlled rectifier devices;
 a pair of direct current input terminals;
 at least a pair of alternating current terminals;
 a pair of direct current output terminals;
 means connecting said direct current output terminals to said rectifier means;
 oscillator means for converting direct current to alternating current, said oscillator means including a self-exciting solid state switching circuit;
 means connecting said oscillator means to one of said direct current input terminals;
 means including a first of said center tapped transformer secondary windings for generating and applying control voltages to said oscillator means switching circuit;
 switch means for selectively connecting said rectifier means and said oscilator means to secondary windings of said transformer, said switch means connecting said oscillator means switching circuit across a second of said center-tapped secondary windings of said transformer, said switch means also connecting the second of said direct current input terminals to the center tap of said second of said center-tapped secondary windings;
 means connecting said alternating current terminals to said transformer primary windings whereby alternating current may be applied to the apparatus or may be received from the apparatus when a source of direct current is applied across said direct current input terminals and said oscillator means is connected to said second center-tapped secondary winding of said transformer by said switch means;
 diode means connected in series with said direct current input terminals and said oscillator means for preventing application of voltage of the wrong polarity to said oscillator means; and
 blocking capacitor means, said blocking capacitor means being connected between the center taps of said first and second center tapped transformer secondary windings by said switch means when said oscillator means is connected to said secondary winding of said transformer by said switch means.

2. The apparatus of claim 1 wherein said transformer primary winding has a plurality of intermediate taps so that it may be operated as an autotransformer.

3. The apparatus of claim 2 wherein the secondary winding of said transformer which is connectable to said rectifier means by said switch means has a plurality of intermediate taps whereby the alternating current applied to said rectifier means may be varied by said switch means.

References Cited

UNITED STATES PATENTS

| | | | |
|---|---|---|---|
| 2,251,302 | 8/1941 | Stehlik | 321—2 X |
| 2,959,726 | 11/1960 | Jensen | 331—113.1 |
| 3,017,559 | 1/1962 | Mallory | 321—2 X |
| 3,148,286 | 9/1964 | Pickering et al. | 331—113.1 X |

OTHER REFERENCES

RCA Technical Notes No. 250, "Polarity Protector for Transistorized Converters," 1 page, Rec'd. Sci. Lib. Jan. 5, 1959.

Electronics, "Solid-State Thyratron Switches Kilowatts," pp. 52–55, Mar. 28, 1958.

JOHN F. COUCH, Primary Examiner

W. H. BEHA, Jr., Assistant Examiner

U.S. Cl. X.R.

321—2